(12) United States Patent
Swaminathan

(10) Patent No.: US 9,019,944 B2
(45) Date of Patent: Apr. 28, 2015

(54) DIAGNOSING AND RESOLVING WIRELESS NETWORK MALFUNCTIONS

(75) Inventor: Kailash Swaminathan, Chennai (IN)

(73) Assignee: Koninklijke Philips N.V., Eindhoven (NL)

( * ) Notice: Subject to any disclaimer, the term of this patent is extended or adjusted under 35 U.S.C. 154(b) by 116 days.

(21) Appl. No.: 13/384,876

(22) PCT Filed: Jul. 20, 2010

(86) PCT No.: PCT/IB2010/053298
§ 371 (c)(1),
(2), (4) Date: Apr. 4, 2012

(87) PCT Pub. No.: WO2011/013029
PCT Pub. Date: Feb. 3, 2011

(65) Prior Publication Data
US 2012/0182877 A1    Jul. 19, 2012

(30) Foreign Application Priority Data

Jul. 28, 2009 (EP) .................................... 09166603

(51) Int. Cl.
*H04W 24/00* (2009.01)
*H04W 24/04* (2009.01)

(52) U.S. Cl.
CPC .............. *H04W 24/00* (2013.01); *H04W 24/04* (2013.01)

(58) Field of Classification Search
CPC ................................ H04W 24/00; H04W 80/02
See application file for complete search history.

(56) References Cited

U.S. PATENT DOCUMENTS

| 6,697,337 B1 | 2/2004 | Cafarelli et al. |
| 7,392,046 B2 | 6/2008 | Leib et al. |

(Continued)

FOREIGN PATENT DOCUMENTS

WO    2006113168 A2    10/2006

OTHER PUBLICATIONS

S. Fogie: "Security Reference Guide"; Internet Article on the 802.11 Protocol, Downloaded From file:///H:Data/2009-IDs/MAY/ID896989_RAVI/content.aspx.htm, on May 28, 2009, 6 page document.

(Continued)

*Primary Examiner* — Jason Mattis

(57) ABSTRACT

A preconditioned air unit (10) for supplying preconditioned air to an aircraft parked on the ground, the preconditioned air unit comprising a main unit with a housing (12) accommodating a flow duct (20) with an air inlet (22) for ambient air and an air outlet (25) for connection to the parked aircraft, a blower (30) connected with the flow duct for generation of an air flow from the air inlet toward the air outlet, and a plurality of compartments (34), each of which is configured for accommodation of a self-contained cooling module comprising at least one refrigeration system, each of which includes at least one compressor (38), at least one condenser (40), at least one expansion valve (42), and at least one evaporator (44) connected in a flow circuit containing a refrigerant, and wherein each compartment is further configured so that the at least one evaporator interacts with the air flow in the flow duct when the self-contained cooling module is installed in the compartment, and wherein at least one self-contained cooling module is installed in the plurality of compartments.

14 Claims, 6 Drawing Sheets

(56) References Cited

U.S. PATENT DOCUMENTS

| | | | |
|---|---|---|---|
| 2006/0077946 A1* | 4/2006 | Adya et al. | 370/349 |
| 2006/0233114 A1* | 10/2006 | Alam et al. | 370/252 |
| 2007/0097896 A1 | 5/2007 | Qi | |
| 2007/0239876 A1 | 10/2007 | Chandra et al. | |
| 2007/0256122 A1* | 11/2007 | Foo et al. | 726/5 |
| 2009/0113052 A1 | 4/2009 | Doshi et al. | |
| 2013/0064101 A1* | 3/2013 | Flynn et al. | 370/242 |

OTHER PUBLICATIONS

J. Moran: "Wireless Network Configuration Tips for Windows XP"; Internet Article on Windows Connect Now (WCN), Downloaded From file:///H:Data/2009-IDs/MAY/ID896989_RAVI/3678561.htm, on May 28, 2009, 9 Page Article.

Chandra et al : "Beacon-Stuffing: Wi-Fi Without Associations"; Eighth IEEE Workshop on Mobile Computing Systems and Applications, Mar. 2007, pp. 53-57.

* cited by examiner

DIAGNOSING AND RESOLVING WIRELESS NETWORK MALFUNCTIONS

FIELD OF THE INVENTION

The subject matter relates to wireless communication networks and more specifically to diagnosis and resolution of wireless connectivity setup problems while a network-compatible wireless device is newly added to the wireless communication network.

BACKGROUND OF THE INVENTION

U.S. Pat. No. 7,392,046 discloses a method and apparatus for automatic diagnosis and resolution of wireless network malfunctions. A network malfunction diagnosis is done by comparing information gathered from a plurality of wireless network components to a predefined set of rules. The comparison may be performed using comprehensive query language capabilities. The method is limited by the predefined set of rules available for diagnosing the malfunction.

SUMMARY OF THE INVENTION

Accordingly, it is an object of the present subject matter to improve the diagnosis and resolution of wireless communication network malfunctions. The present subject matter is defined by the independent claims. The dependent claims define advantageous embodiments.

The object of the present subject matter is realized by providing a method for detecting a problem in a wireless communication network while a wireless device is newly added to the wireless communication network, the method for detecting the problem comprising:

embedding information associated with the newly added wireless device into a communication protocol, the embedded information including information about the errors encountered by the wireless device while the wireless device is newly added to the wireless communication network;

transmitting the embedded information over the wireless communication network to a diagnostic tool using the communication protocol; and analyzing the received embedded information using the diagnostic tool and determining the cause of the problem and the associated solution.

Generally, to add a wireless device into a wireless communication network user has to set correct values for the wireless connectivity parameters associated with the wireless device. As an illustrative example, in case of Wi-Fi (e.g. IEEE 802.11x), a few of these parameters could be Service Set Identifier (SSID), Channel Number and Security Key or Passphrase. If the configuration of the wireless connectivity parameters of the newly added wireless device is incorrect, then the wireless device may not be able to join the wireless communication network and perform its normal operation. It could be difficult for the user to find out the problem and rectify it as the user may not have sufficient technical background knowledge. Further, due to the complexity involved in setting up the wireless connection, the call centre personal might find it difficult to solve the problem over phone. All these could lead to lower user satisfaction levels and hence a reduced Net Promoter Score (NPS).

Accordingly, it is desirable to provide a method that can help the user in diagnosing the problems encountered while adding the wireless device to the wireless communication network. This could enable the user to ensure correct functioning of the newly added wireless device.

In the disclosed method, the wireless device whose connectivity is impaired sends out a "distress message" using a communication protocol. The distress message could include information about the errors encountered while the wireless device is newly added to the wireless communication network. The distress message sent by the impaired wireless device is received by a diagnostic tool. The diagnostic tool analyzes the distress message and detects the problem. Once the problem is diagnosed, it is possible to display a status/error message on the impaired wireless device itself. Further, the diagnostic tool could suggest a solution to fix the connectivity problem and ensure correct operation of the newly added wireless device. Users who do not understand the technology can read out the recommendations of the diagnostic tool to call center personnel who could then guide the user to correct the problem in the wireless network. The idea disclosed here is to exchange information via a special communication mechanism which is not dependent on the wireless network configuration. The exchanged information could subsequently be used to adapt the configuration settings of the impaired wireless device.

The disclosed method is useful for Wireless Local Area Network applications wherein a wireless communication that does not require proper wireless network configuration is used to exchange configuration information. The exchanged configuration information could subsequently be used to adapt the configuration settings on one of the nodes in the Wireless Local Area Network.

In an embodiment, the diagnostic tool resides on one of the wireless devices connected to the wireless communication network or on an access point or on a router. This is advantageous since there is no need for external communication in order to analyze the embedded information and diagnose the problem.

In a further embodiment, the method comprises using a unique key and encrypting the information associated with the newly added wireless device and embedding the encrypted information into the communication protocol. This could enable secure communication of the embedded information and ensure that the newly added wireless device is interacting with a trusted diagnostic tool. Further advantage is that sensitive information like security key/passphrase that are generally manually set by the user on the wireless device can be shared with the diagnostic tool to aid in diagnosis without compromising the security of the wireless network.

In a still further embodiment, the unique key is derived from at least one of
 a user defined password
 a biometric
 a tag This embodiment could protect the embedded information and prevent unauthorized access to the wireless communication network. Further, this embodiment could provide a convenient and low cost additional tier of security.

The tag could be in the form of a self-adhesive label (e.g. RF-ID tag or resistor tag). The idea behind the labels is that it allows the user to stick self-adhesive labels on devices in the wireless network which enable them to join the wireless network by requesting the network configuration from other wireless devices in the wireless network.

In a still further embodiment, the wireless network communication protocol is in compliance with IEEE 802.11 and the information associated with the newly added wireless device is embedded in the management frame, preferably the Probe Request Management Frame and a modified Probe Request Management Frame is transmitted over the wireless communication network.

Wi-Fi protected Setup (WPS) is a standard created by the Wi-Fi alliance for easy and secure establishment of wireless home network. A mechanism of pushing information over Wi-Fi by embedding data in standard IEEE 802.11 packets is known. The disclosed method uses a similar concept for diagnosing the problems that can occur while setting up a wireless device in a wireless communication network environment.

A Probe Request Management Frame is used by a station to find an access point and get information about its capabilities. The frame body of a Probe Request Management frame contains the Secure Set Identifier (SSID) of the Basic Service Set of interest and the supported transmission rates. The maximum data size of the frame body of a Management Frame is 2312 bytes. As the information contained within the Probe Request Management Frame occupies fewer bytes it is a very good candidate to embed diagnostic information. For the wireless device trying to join an IEEE 802.11 wireless network, initially it is both unauthenticated and unassociated. In this state, the IEEE standard allows access to only Class 1 frames. Probe Request Management frame is one such Class 1 frame. Hence the Probe Request Management frame can be used for diagnosis as the wireless device which has failed to connect to a wireless network would still be able to access the Probe Request Management frame.

In a still further embodiment, the modified Probe Request Management Frame is analyzed to determine the cause of the problem and the associated solution. The modified Probe Request Management Frame comprises information associated with the impaired wireless device. Analyzing the information can help in proper diagnosis of the problem and in finding a solution to the diagnosed problem.

Generally, the wireless devices which operate in wireless local area networks (WLAN) needs to establish connectivity at different levels (namely, IEEE 802.11 MAC, Internet Protocol) before they can operate normally. Currently, when a problem occurs while adding the wireless device newly to a wireless network, it is difficult to pin-point the actual source of the error (whether in the Wi-Fi or IP subsystems) and hence difficult to diagnose and solve the problem. The disclosed method specifies few parameters associated with the impaired wireless device, that can be embedded as additional information that can aid in the diagnosis and help in suggesting remedial actions.

In a still further embodiment, the modified Probe Request Management Frame includes at least one of:
- the newly added wireless device specific information that includes the wireless device number and the model number
- the newly added wireless device connectivity status and the associated errors
- the newly added wireless device connectivity settings that include service set identifier, channel number and security key
- a history of prior errors encountered while the wireless device was added to the wireless communication network.

The wireless device specific information could be used to uniquely identify the impaired wireless device in the wireless network and address the solutions for solving the connectivity problem related to the impaired wireless device.

The IEEE 802.11 standard identifies three distinct states (Cf. FIG. 8, IEEE Standard 802.11, 1999 Edition) of operation for the wireless device in an IEEE 802.11 wireless network. These states determine the capacity for the wireless device to operate normally and can be used for diagnosing the probable cause of error. As an illustrative example, if the wireless device is in the state "Authenticated, Unassociated" and the error encountered while moving to the next state "Authenticated, Associated" is "Association denied because the access point is unable to handle additional association stations" then this information can be used to diagnose the problem correctly and suggest to the user to remove other wireless devices from the wireless network for the new wireless device to join the wireless network.

Generally, the connectivity settings are manually set by the user on the wireless device and hence could be prone to typographical errors. These kinds of errors can be captured by sending the user set values to the diagnostic tool by embedding them in the Probe Request Management frame. This is where encrypting the information in the Probe Request Management frame could be useful as it will prevent eavesdropper from getting access to sensitive information like security key.

Further, to diagnose problems encountered during the normal operations of the wireless device, it could be useful to get a list of recently encountered errors by the newly added wireless device. For example, if the device like a microwave oven is switched on, it can cause interference in the wireless network (especially in the 2.4 GHz range). A wireless device functioning properly until then would start to see many data packets being dropped due to interference added to the channel due to operation of the microwave oven. This information could be useful to diagnose the cause of the problem and the same can be notified to the user. The same mechanism could be used to report other wireless device related problems e.g. hardware failures.

The impaired wireless device sends a modified IEEE 802.11 Probe Request Management Frame. The IEEE 802.11 Management Frames follow the general MAC (Media Access Control) frame format. The Probe Request Management Frame is sent to get more information about an access point/ Wi-Fi router that it wants to connect to. The access point responds with IEEE 802.11 Probe Response Management Frame.

The frame body of IEEE 802.11 Probe Request Management Frame can be as large as 2312 octets (bytes). Generally, only few of them are used to specify the mandatory frame body, the remaining can be used to carry proprietary messages, if required.

In the disclosed method, the proprietary message could comprise the impaired wireless device specific details including but not limited to device information (device name, model number), device connectivity status, device wireless parameters (SSID, Channel Number, Security Key) and device specific errors. Since the setup of most of the wireless devices is manual, it is likely that the user makes a typographical mistake while setting up the wireless device. As and when the customer enters wireless parameters like SSID, Channel Number, Security Key, notifying the user edited information to the diagnostic tool could be used to verify that they are indeed correct. Since it is assumed that the diagnostic tool is running on a wireless device that already has established wireless connectivity, it follows that the diagnostic tool will have the correct set of these network parameters against which it can check the parameter set sent by the impaired wireless device.

In a still further embodiment, the Basic Service Set Identifier of the wireless communication network is set to a unique identifier. This could enable identification of the modified Probe Request Management Frame. This can help the diagnostic tool in ignoring other Probe Request Management Frames and reduce the processing requirements.

The intended use of the Probe Request Management Frame according to IEEE Standard 802.11, 1999 Edition is that the wireless station devices should know the capabilities of the access point to which it is trying to connect. So in any wireless network there will be number of Probe Request Management frames being sent by different wireless devices at different instances. To reduce the load on the diagnostic tool so that it doesn't try to process all the Probe Request Management frames meant actually for the access point, a unique BSSID (e.g. Philips Connected Plant Diagnostics) can be determined which could be used both by the impaired wireless device and the diagnostic tool.

In a still further embodiment, analyzing the modified Probe Request Management Frame using the diagnostic tool comprises at least one of:

checking whether the IP address of the newly added wireless device is in the auto-IP range and if so inferring that the problem is either the Dynamic Host Configuration Protocol (DHCP) server is down or Media Access Control (MAC) filtering is enabled;

checking whether there is a difference in channel number or security pass phrase.

If the wireless device IP address is in the Auto-IP range, it means that it has failed to obtain an IP address from the DCHP server on the wireless network. This could be due to either the DHCP server being temporarily down or MAC filtering being enabled on the router and the MAC address of the newly added wireless device being not added to the allow list. Since it is assumed that the diagnostic tool has access to the wireless network, it can then determine which of the case is true (whether DHCP server is down or MAC filtering is enabled) and help the user diagnose the problem.

As the channel number or security pass phrase parameters are manually entered by the user on the wireless device, there could be typographical mistakes and due to which the wireless device may not be able to join the wireless network. As the diagnostic tool has access to the correct values for the wireless network it can compare those values with the ones entered on the wireless device and inform the user if they don't match.

In a still further embodiment, the method notifies the determined cause of the problem and the associated solution to the user. This enables the user to fix the determined problem and ensure a correct operation of the newly added wireless device. This could increase user satisfaction levels and improve the Net Promoter Score.

In a still further embodiment, the method comprises initiating a service request to report non-functionality of the newly added wireless device and providing the determined cause of the problem and the associated solution to at least one of the wireless communication network configuration manager a customer service center.

This embodiment can facilitate automatic/semi-automatic fixing up of the determined problem. Users who do not understand the technology can read out the recommendations of the diagnostic tool to call center personnel who could then guide the user to correct the problem in the wireless network. This can further help in speedy closure of customer support calls. This can also be of further help in understanding the source of the problem thereby reducing the risk of drawing incorrect conclusions e.g. the user may conclude that there is a problem/error with the purchased wireless device even though the source of the problem/error is in the configuration of the wireless communication network. This could further increase user satisfaction levels and improve the Net Promoter Score.

In a still further embodiment, the newly added wireless device is at least one of a printer, a personal computer, a personal digital assistant, a handheld computer, a notebook computer, a digital phone, a digital video player, a digital audio player or a node in a wireless local area network.

In a further object of the present subject matter a detection unit for detecting a problem in a wireless communication network while a wireless device is newly added to the wireless communication network is disclosed. The detection unit for detecting the problem comprises:

an embedding unit for embedding information associated with the newly added wireless device into a communication protocol, the embedded information including information about the errors encountered by the wireless device while the wireless device is newly added to the wireless communication network;

a transmitting unit for transmitting the embedded information over the wireless network to a diagnostic tool wherein the diagnostic tool further comprises an analyzer for analyzing the received embedded information and determining the cause of the problem and the associated solution.

In some embodiments the wireless communication network could be a digital home network. The digital home network can comprise a plurality of home appliances connected through a communication media. The digital home network can comprise the detection unit for detecting a problem in the digital home network while a wireless device is newly added to the digital home network.

In a still further object of the present subject matter a software program for detecting a problem in a wireless communication network while a wireless device is newly added to the wireless communication network is disclosed. The software program comprises program code means configured to:

embed information associated with the newly added wireless device into a communication protocol, the embedded information including information about the errors encountered by the wireless device while the wireless device is newly added to the wireless communication network;

transmit the embedded information over the wireless communication network to a diagnostic tool; and analyze the received embedded information using a diagnostic tool and determine the cause of the problem and the associated solution.

BRIEF DESCRIPTION OF THE DRAWINGS

The above-mentioned aspects, features and advantages will be further described, by way of example only, with reference to the accompanying drawings, in which the same reference numerals indicate identical or similar parts, and in which.

DETAILED DESCRIPTION OF THE EMBODIMENTS

Figure 1:
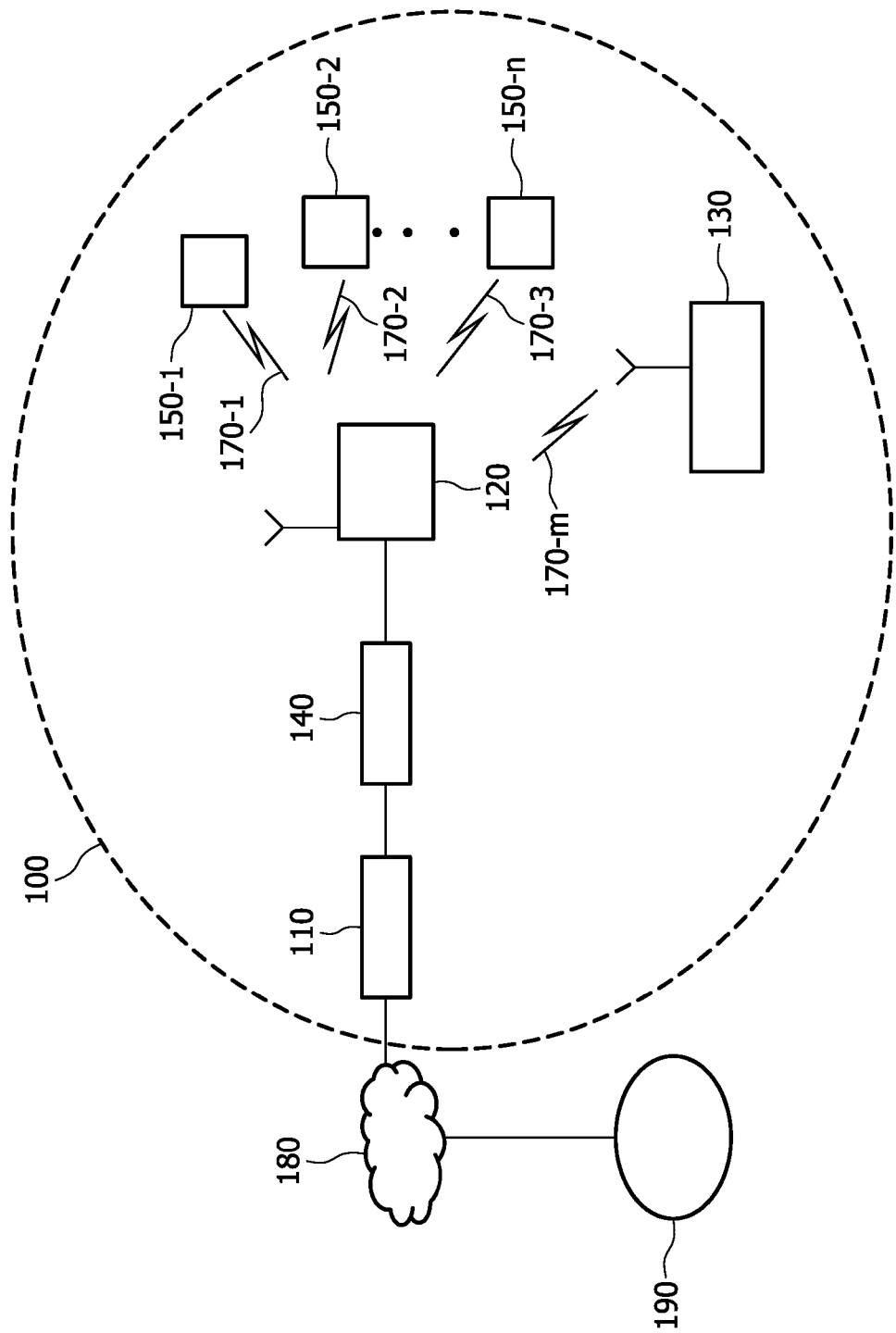
FIG. 1 shows an exemplary configuration of a wireless communication network according to an embodiment of the present subject matter.

Referring now to FIG. 1, the wireless communication network 100 comprises
1) a router 140
2) an access point 120
3) a modem 110 coupled to the router 140
4) a plurality of wireless devices 150-1, 150-2, 150-$n$.

The wireless devices 150-1, 150-2, 150-$n$ may be, but are not limited to, personal digital assistants (PDAs), personal computers, hand held computers, notebook computers, mobile phones, digital audio players, digital video players or any other type of handheld or personal wireless electronic device from which it may be desired to communicate with another device or another computer network. The wireless communications network 100 could be a digital home network comprising a plurality of home appliances connected through a communication media.

The wireless communication network 100 further comprises a network printer 130 that is shared among all the wireless devices 150. The access point 120 is coupled to the router 140. The combination of the access point 120 and the router 140 allows providing network services to the wireless devices 150-1, 150-2, 150-$n$. The connection between the printer 130 and the wireless devices 150 is formed through access point 120, wherein the connection is a wireless signal e.g., an infrared signal. It should be noted that, while a single access point 120 and a single router 140 are shown, that a plurality of each are also possible in the wireless communication network 100.

The wireless devices 150-1, 150-2, 150-$n$ are connected to respective proximally located beacons 170-1 through 170-$m$. A single device 150 may communicate with multiple beacons as it moves, and vice versa, a single beacon 170 may communicate with multiple devices in its vicinity. The beacons 170-1 through 170-$m$ are independently capable of transmitting wireless signals, such as radio frequency (RF) signals, infrared signals, visible light signals or other signals. The wireless devices 150-1, 150-2, 150-$n$ are connected to an Internet Service Provider (ISP) 190 through a wide area network (WAN) 180. In one configuration of the wireless communication network 100, the connection to WAN 180 may be established through a firewall and a proxy server. In another configuration, the wireless communication network 100 can be a wireless local area network (WLAN), such as those based on the IEEE 802.11 standard, Bluetooth or infrared links.

The wireless communication network 100 may be operated in any area providing various resources available for wireless access. Such an area may be located in an airport, a foodservice business (e.g. a coffee shop), a business resource center of a hotel, a museum or a home.

Figure 2:
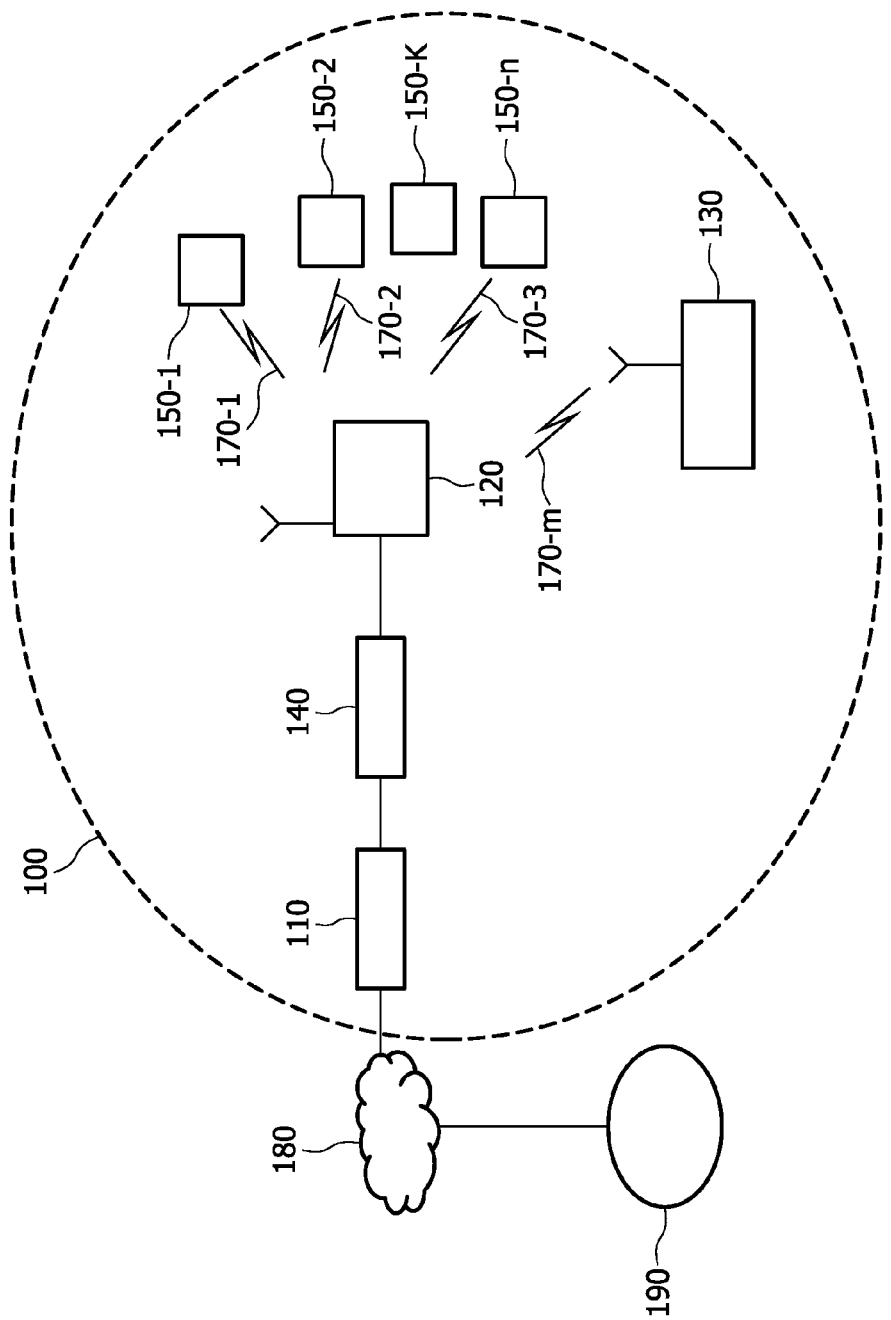
FIG. 2 shows an exemplary configuration of a wireless communication network when a wireless device is newly added to the wireless communication network.

Referring now to FIG. 2, user newly adds a wireless device 150-$k$ to the wireless communication network 100. When the user connects the wireless device 150-$k$ to the wireless communication network 100, the user has to set the correct values for the wireless connectivity parameters. As an illustrative example, in case of Wi-Fi (e.g. IEEE 802.11x), a few of these parameters could be Service Set Identifier (SSID), Channel Number and Security Key or Passphrase. If the configuration of the wireless connectivity parameters of the wireless device 150-$k$ is incorrect, then the wireless device may not be able to join the wireless communication network 100 and perform its normal operation. The newly added wireless could also face connectivity problems due to the settings of the wireless network infrastructure nodes (like MAC filtering enabled on the router) or due to the composition of the wireless network (e.g., already too many devices in the wireless network or unauthorized access of the wireless network by rogue elements). It could be difficult for the user to find out the problem and rectify the problem. Further, due to the complexity involved in setting up the wireless connection, the call center personnel might find it difficult to fix the problem over phone. Also users who do not have technical background could find it difficult to explain to the call center personnel the exact nature of the problem. All these could lead to lower user satisfaction levels and hence a reduced Net Promoter Score.

Figure 3:
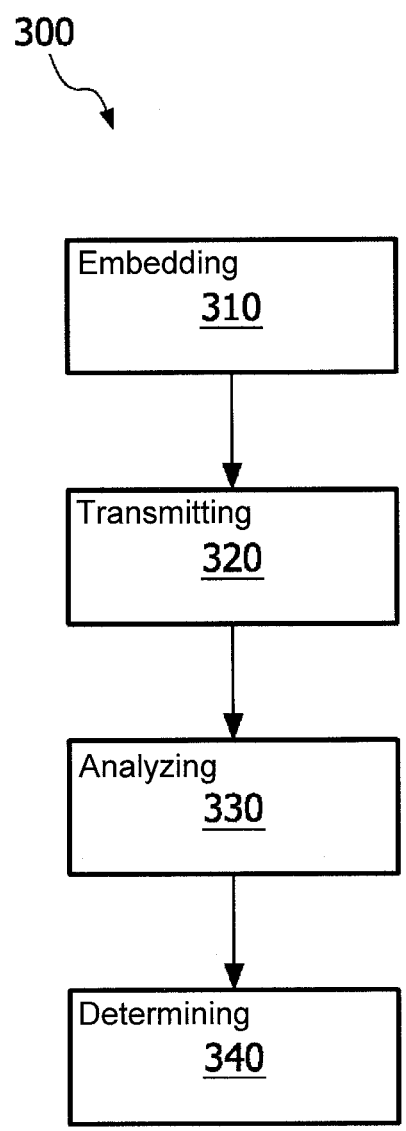
FIG. 3 schematically shows an exemplary flowchart illustrating the method of detecting a problem in the wireless communication network while the wireless device is newly added to the wireless network.

Referring now to FIG. 3, the idea behind the disclosed method is to exchange information via a special communication mechanism which is not dependent on the wireless network configuration. Further, the exchanged information could subsequently be used to adapt the configuration settings of the impaired wireless device 150-$k$.

The method of detecting the problem comprises a step 310 of embedding information associated with the newly added wireless device 150-$k$ into a communication protocol. The embedded information includes information about the errors encountered while the wireless device 150-$k$ is newly added to the wireless communication network. A step 320 transmits the embedded information over the wireless communication network 100 to a diagnostic tool using the communication protocol. A step 330 analyzes the received embedded information using the diagnostic tool and determines the cause of the problem and the associated solution.

In the disclosed method, the wireless device 150-$k$ whose connectivity is impaired sends out a "distress message" using the communication protocol. The distress message could include information about the errors encountered while the wireless device is newly added to the wireless communication network. The distress message sent by the impaired wireless device is received by a diagnostic tool. The diagnostic tool analyzes the distress message and detects the problem and enables the impaired wireless device to be operational.

Once the problem is diagnosed, it is possible to display a status/error message on the impaired wireless device itself. Further, the diagnostic tool could suggest a solution to fix the connectivity problem and ensure correct operation of the newly added wireless device. Users who do not understand the technology can read out the recommendations of the diagnostic tool to call center personnel who could then guide the user to correct the problem in the wireless network.

The disclosed method is useful for Wireless Local Area Network applications wherein a wireless communication that does not require proper wireless network configuration is used to exchange configuration information. The exchanged configuration information could subsequently be used to adapt the configuration settings on one of the nodes in the Wireless Local Area Network.

The diagnostic tool could reside on one of the wireless devices connected to the wireless communications network 100 or on the access point 120 or on the router 140. This is advantageous since there is no need for external communication in order to analyze the embedded information and diagnose the problem.

Further, the method comprises using a unique key and encrypting the information associated with the newly added wireless device and embedding the encrypted information into the wireless network communication protocol. This could enable secure communication of the embedded information and ensure that the newly added wireless device is interacting with a trusted diagnostic tool. Further advantage is that sensitive information like security key/passphrase that are generally manually set by the user on the wireless device can be shared with the diagnostic tool to aid in diagnosis without compromising the security of the wireless network.

Furthermore, the unique key is derived from at least one of
a user defined password
a biometric
a tag This could protect the embedded information and prevent unauthorized access. This could also provide a convenient and low cost additional tier of security.

The tag could be in the form of a self-adhesive label (e.g. RF-ID tag or resistor tag). The idea behind the labels is that it allows the user to stick self-adhesive labels on devices in the home network which enable them to join the wireless communication network 100 by requesting the network configuration from other wireless devices 150-1, 150-2, . . . 150-n in the wireless communication network.

In some embodiments, the communication protocol is in compliance with IEEE 802.11 and the information associated with the newly added wireless device 150-k is embedded in the management frame, preferably the Probe Request Management Frame and a modified Probe Request Management Frame is transmitted over the wireless communication network 100.

Wi-Fi protected Setup (WPS) is a standard created by the Wi-Fi alliance for easy and secure establishment of wireless home network. A mechanism of pushing information over Wi-Fi by embedding data in standard IEEE 802.11 packets is known (see for instance "Beacon Stuffing: Wi-Fi without Associations", Ranveer Chandra, Jitendra Padhye, Lenin Ravindranath, Alec Wolman, Microsoft Research, research-.microsoft.com/users/alecw/hotmobile-2007.pdf available through the Internet). The disclosed method uses a similar concept for diagnosing the problems that can occur while setting up a wireless device in a wireless communication network environment.

A Probe Request Management Frame is used by a station to find an access point and get information about its capabilities. The frame body of a Probe Request Management frame contains the Secure Set Identifier (SSID) of the Basic Service Set of interest and the supported transmission rates. The maximum data size of the frame body of a Management Frame is 2312 bytes. As the information contained within the Probe Request Management Frame occupies fewer bytes it is a very good candidate to embed diagnostic information. For the wireless device trying to join an IEEE 802.11 wireless network, initially it is both unauthenticated and unassociated. In this state, the IEEE standard allows access to only Class 1 frames. Probe Request Management frame is one such Class 1 frame. Hence the Probe Request Management frame can be used for diagnosis as the wireless device which has failed to connect to a wireless network would still be able to access the Probe Request Management frame.

In some embodiments, the modified Probe Request Management Frame includes at least one of:
the newly added wireless device specific information that includes the wireless device number and the model number
the newly added wireless device connectivity status and the associated errors
the newly added wireless device connectivity settings that include service set identifier, channel number and security key
a history of prior errors encountered while the wireless device was added to the wireless communication network.

Figure 8:
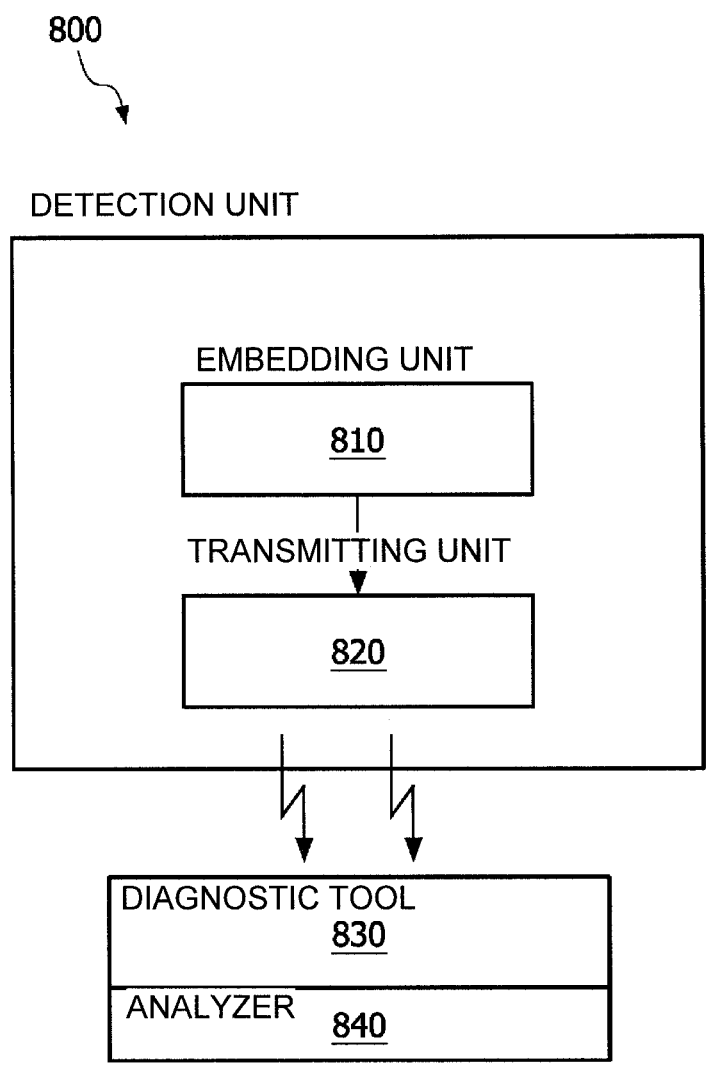
FIG. 8 schematically shows a detection unit for detecting a problem in a wireless communication network according to an embodiment of the present subject matter.

The IEEE 802.11 standard identifies three distinct states (Cf. FIG. 8, IEEE Standard 802.11, 1999 Edition) of operation for the wireless device in an IEEE 802.11 wireless network. These states determine the capacity for the wireless device to operate normally and can be used for diagnosing the probable cause of error. As an illustrative example, if the wireless device is in the state "Authenticated, Unassociated" and the error encountered while moving to the next state "Authenticated, Associated" is "Association denied because the access point is unable to handle additional association stations" then this information can be used to diagnose the problem correctly and suggest to the user to remove other wireless devices from the wireless network for the new wireless device to join the wireless network.

Generally, the connectivity settings are manually set by the user on the wireless device and hence are prone to typographical errors. These kinds of errors can be captured by sending the user set values to the diagnostic tool by embedding them in the Probe Request Management frame. This is where encrypting the information in the Probe Request Management frame could be useful as it will prevent eavesdropper from getting access to sensitive information like security key.

Further, to diagnose problems encountered during the normal operations of the wireless device, it could be useful to get a list of recently encountered errors by the newly added wireless device. For example, if the device like a microwave oven is switched on, it can cause interference in the wireless network (especially in the 2.4 GHz range). A wireless device functioning properly until then would start to see many data packets being dropped due to interference added to the channel due to operation of the microwave oven. This information could be useful to diagnose the cause of the problem and the same can be notified to the user. The same mechanism could be used to report other wireless device related problems e.g. hardware failures.

Figure 4:
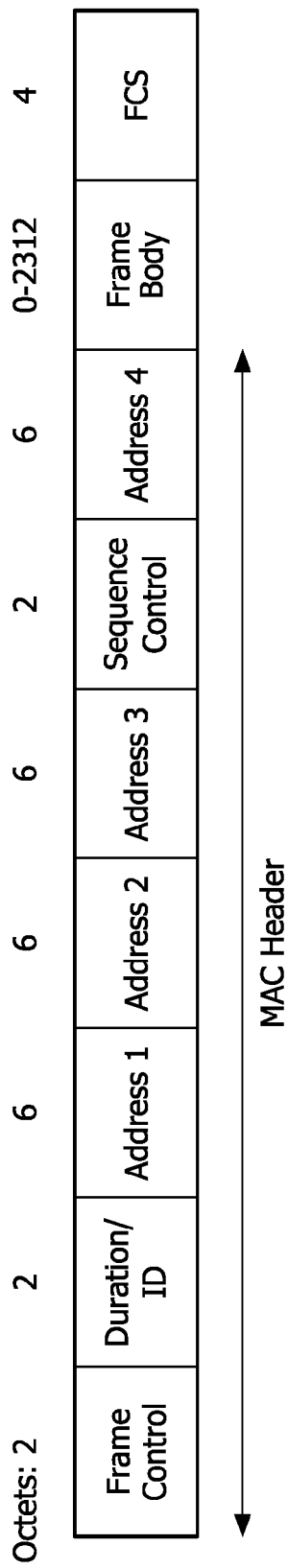
FIG. 4 schematically shows general MAC (Media Access Control) frame format according to the IEEE Standard 802.11.

The impaired wireless device 150-k sends a modified IEEE 802.11 Probe Request Management Frame. The general MAC (Media Access Control) frame format as per IEEE Standard 802.11 is shown in FIG. 4. The IEEE 802.11 management frames follow the general MAC frame format. The Probe Request Management Frame is sent to get more information about the access point 120, the router 140 that it wants to connect to. The access point 120 responds with IEEE 802.11 Probe Response Management Frame. The IEEE 802.11 Management Frame format maps onto the general MAC frame format as shown in FIG. 5.

Figure 5:
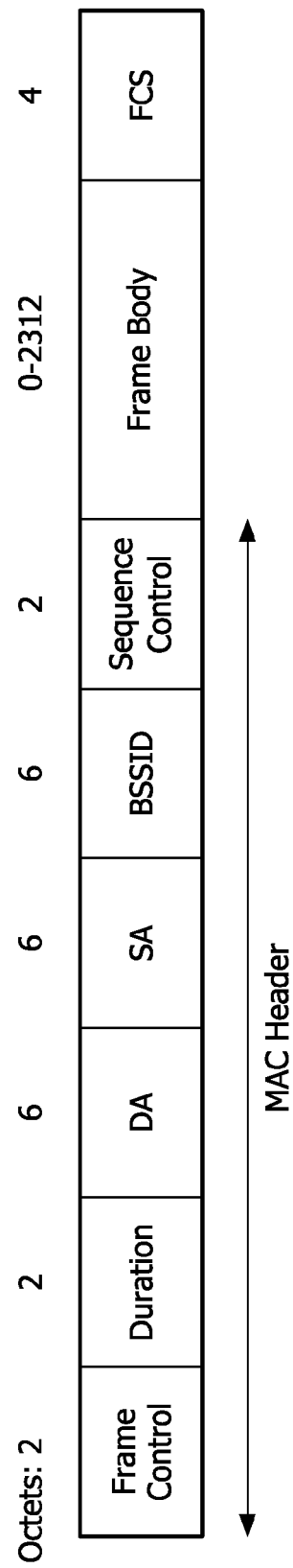
FIG. 5 schematically shows IEEE Standard 802.11 Management Frame Format.
Figures 6, 7:
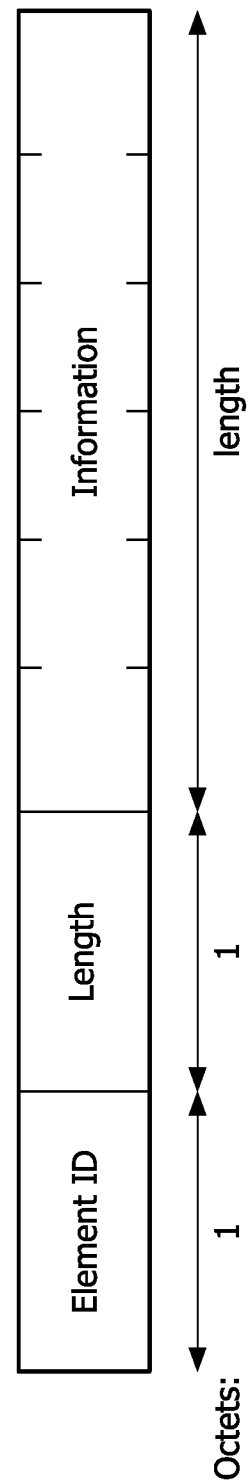
FIG. 6 schematically shows the format of the frame body of an exemplary probe request.
FIG. 7 schematically shows IEEE Standard 802.11 Management Frame Information Element Format.

Referring to FIG. 5, DA is the destination address, SA is the source address and BSSID is the basic service set identifier. In the case of a Probe Request Management Frame, DA is the broadcast MAC address, SA is the device's MAC address (source address) and BSSID is either the specific BSSID of the access point or the broadcast BSSID. The format of the frame body of a Probe Request is as shown in FIG. 6. Each information element has the format shown in FIG. 7.

The frame body can be as large as 2312 octets (bytes). Generally, only few of them are used to specify the mandatory frame body, the remaining can be used to carry proprietary messages, if required.

In the disclosed method, the proprietary message could comprise the impaired wireless device 150-k specific details including but not limited to device information (device name, model number), device connectivity status, device wireless parameters (SSID, Channel Number, Security Key) and device specific errors. Since the setup of most of the wireless devices is manual, it is likely that the user makes a typographical mistake while setting up the wireless device. As and when the customer enters wireless parameters like SSID, Channel Number, Security Key, notifying the user edited information to the diagnostic tool could be used to verify that they are indeed correct. Since it is assumed that the diagnostic tool is running on a wireless device that already has established wireless connectivity, it follows that the diagnostic tool will have the correct set of these network parameters against which it can check the parameter set sent by the impaired wireless device.

The Basic Service Set Identifier of the wireless communication network could be set to a unique identifier. This could enable identification of the modified Probe Request Management Frame. This can reduce the processing requirements since the diagnostic tool could ignore other Probe Request Management Frames.

The intended use of the Probe Request Management Frame according to IEEE Standard 802.11, 1999 Edition is that the wireless station devices should know the capabilities of the access point to which it is trying to connect. So in any wireless network there will be number of Probe Request Management frames being sent by different wireless devices at different instances. To reduce the load on the diagnostic tool so that it doesn't try to process all the Probe Request Management frames meant actually for the access point, a unique BSSID (e.g. Philips Connected Plant Diagnostics) can be determined which could be used both by the impaired wireless device and the diagnostic tool.

In some embodiments, analyzing the modified Probe Request Management Frame using the diagnostic tool includes at least one of:

checking whether the IP address of the newly added wireless device is in the auto-IP range and if so inferring that the problem is either the Dynamic Host Configuration Protocol (DHCP) server is down or Media Access Control (MAC) filtering is enabled;

checking whether there is a difference in channel number or security pass phrase.

If the wireless device IP address is in the Auto-IP range, it means that it has failed to obtain an IP address from the DCHP server on the wireless network. This could be due to either the DHCP server being temporarily down or MAC filtering being enabled on the router and the MAC address of the newly added wireless device being not added to the allow list. Since it is assumed that the diagnostic tool has access to the wireless network, it can then determine which of the case is true (whether DHCP server is down or MAC filtering is enabled) and help the user diagnose the problem.

As the channel number or security pass phrase parameters are manually entered by the user on the wireless device, there could be typographical mistakes and due to which the wireless device may not be able to join the wireless network. As the diagnostic tool has access to the correct values for the wireless network it can compare those values with the ones entered on the wireless device and inform the user if they don't match.

Further, the determined cause of the problem and the associated solution could be notified to the user. This enables the user to fix the determined problem and ensure a correct operation of the newly added wireless device 150-$k$. This could increase user satisfaction levels and improve the Net Promoter Score.

Further, in some embodiments, a service request could be initiated to report non-functionality of the newly added wireless device. The determined cause of the problem and the associated solution are provided to at least one of the wireless communication network configuration manager a customer service center.

This can facilitate automatic/semi-automatic fixing up of the determined problem. Users who do not understand the technology can read out the recommendations of the diagnostic tool to call center personnel who could then guide the user to correct the problem in the wireless network. This can further help in speedy closure of customer support calls. This can also be of further help in understanding the source of the problem thereby reducing the risk of drawing incorrect conclusions e.g. the user may conclude that there is a problem/error with the purchased wireless device even though the source of the problem/error is in the configuration of the wireless communication network. This could further increase user satisfaction levels and improve the Net Promoter Score.

In some embodiments, the newly added wireless device 150-$k$ is at least one of a printer, a personal computer, a personal digital assistant, a handheld computer, a notebook computer, a digital phone, a digital video player, a digital audio player or a node in a wireless local area network.

The disclosed method can be implemented as a software program (i.e. a diagnostic tool) that can be executed on the personal computer connected to the wireless communication network 100. Alternately, the software program can be downloaded from a website.

A detection unit can be provided in the wireless communication network 100 as shown in FIG. 8. The detection unit can be configured to detect the problem in the wireless communication network while the wireless device is newly added to the wireless communication network as disclosed in the embodiments. The detection unit 800 comprises an embedding unit 810 for embedding information associated with the newly added wireless device 150-$k$ into a communication protocol, the embedded information including information about the errors encountered by the wireless device while the wireless device is newly added to the wireless communication network. The detection unit comprises a transmitting unit 820 configured for transmitting the embedded information over the wireless communication network 100 to a diagnostic tool 830. The diagnostic tool further comprises an analyzer 840 for analyzing the received embedded information and determining the cause of the problem and the associated solution. In some embodiments, the newly added wireless device 150-$k$ could be a node in the wireless communications network 100.

In summary, a method for detecting a problem in a wireless communication network while a wireless device is newly added to the wireless communication network is disclosed. The method for detecting the problem comprises embedding information associated with the newly added wireless device into a communication protocol, the embedded information including information about the errors encountered by the wireless device while the wireless device is newly added to the wireless communication network, transmitting the embedded information over the wireless communication network to a diagnostic tool using the communication protocol and analyzing the received embedded information using the diagnostic tool and determining the cause of the problem and the associated solution.

The disclosed subject matter can be used for detecting and diagnosing wireless setup related problems of wireless capable devices. The present subject matter could also be made part of an existing industry protocol for home network administration to add to it the capability to detect and diagnose wireless setup device related issues. The present subject matter could also be used to help lay-users easily setup and operate any wireless device in the home network and thereby increase the Net Promoter Score.

While the subject matter has been illustrated in detail in the drawings and foregoing description, such illustration and description are to be considered illustrative or exemplary and not restrictive; the subject matter is not limited to the disclosed embodiments. Other variations to the disclosed embodiments can be understood and effected by those skilled in the art of practicing the claimed subject matter, from a study of the drawings, the disclosure and the appended claims. Use of the verb "comprise" and its conjugates does not exclude the presence of elements other than those stated in a claim or in the description. Use of the indefinite article "a" or "an" preceding an element or step does not exclude the presence of a plurality of such elements or steps. A single unit may fulfill the functions of several items recited in the claims. The mere fact that certain measures are recited in mutually different dependant claims does not indicate that a combination of these measures cannot be used to advantage. The figures and description are to be regarded as illustrative only and do not limit the subject matter. Any reference sign in the claims should not be construed as limiting the scope.

The invention claimed is:

1. A method for diagnosing an error encountered in response to an attempt to newly add a first wireless device to a wireless communication network having a plurality of components selected from wireless devices, access points, and routers, the method comprising acts of:
providing a diagnostic tool on one of the plurality of components of the wireless communication network;
embedding into a communication protocol a description of the error encountered in response to the attempt to newly add the first wireless device to the wireless communication network;
transmitting the embedded description over the wireless communication network using the communication protocol;
the diagnostic tool receiving and analyzing the description of the error embedded into the communication protocol and determining a cause of the error and an associated solution,
wherein the communication protocol is in compliance with IEEE 802.11 and the description is embedded in a Probe Request Management Frame and is transmitted over the wireless communication network.

2. The method as claimed in claim 1, wherein the diagnostic tool resides on one of the wireless devices connected to the wireless communication network.

3. The method as claimed in claim 1, further comprising an act of: encrypting, using a unique key, the description, wherein the act of embedding embeds the encrypted description into the communication protocol.

4. The method as claimed in claim 3, wherein the unique key is derived from at least one of a user defined password, a biometric, and a tag.

5. The method as claimed in claim 1, wherein the modified Probe Request Management Frame of the communication protocol is analyzed to determine the cause of the error and the associated solution.

6. The method as claimed in claim 1, wherein the modified Probe Request Management Frame includes at least one of: a wireless device number and a model number of the first wireless device, connectivity status and the associated error of the first wireless device, connectivity settings that include at least one of service set identifier, channel number and security key, a history of prior errors encountered while adding the first wireless device to the wireless communication network.

7. The method as claimed in claim 1, wherein a Basic Service Set identifier of the wireless communication network is set to a unique identifier.

8. The method as claimed in claim 5, wherein analyzing comprises at least one act of:
checking whether an IP address of the first wireless device is in an auto-IP range and if so inferring that the error is either a Dynamic Host Configuration Protocol (DHCP) server is down or Media Access Control (MAC) filtering is enabled; and
checking whether there is a difference in channel number or security pass phrase.

9. The method as claimed in claim 1, further comprising an act of: notifying a user of the determined cause of the error and the associated solution.

10. The method as claimed in claim 1, further comprising an act of: initiating a service request to report the error of the first wireless device and providing the determined cause of the error and the associated solution to at least one of a wireless communication network configuration manager and a customer service center.

11. The method as claimed in claim 1, wherein the first wireless device is at least one of a printer, a personal computer, a personal digital assistant, a handheld computer, a notebook computer, a digital phone, a digital audio player, a digital video player or a node in a wireless local area network.

12. A detection unit selected from wireless devices, access points, and routers connected to a wireless communication network for diagnosing an error encountered in response to an attempt to newly add a first wireless device to the wireless communication network, the detection unit comprising:
an embedder for embedding into a communication protocol a description of the error encountered in response to the attempt to newly add the first wireless device to the wireless communication network;
a transmitter for transmitting the embedded description over the wireless communication network;
a diagnostic tool for
receiving and analyzing the description of the error embedded into the communication protocol, and
determining a cause of the error and an associated solution,
wherein the communication protocol is in compliance with IEEE 802.11 and the description is embedded in a Probe Request Management Frame and is transmitted over the wireless communication network.

13. The detection unit as claimed in claim 12, wherein the wireless communication network is a home network.

14. A non transitory computer readable medium for storing a software program that when executed on a processor performs a method for diagnosing an error encountered in response to an attempt to newly add a first wireless device to a wireless communication network having a plurality of components selected from wireless devices, access points, and routers, the method comprising acts of:
providing a diagnostic tool on one of the plurality of components of the wireless communication network;
embedding into a communication protocol a description of the error encountered in response to the attempt to newly add the first wireless device to the wireless communication network;

transmitting the embedded description over the wireless communication network using the communication protocol;
the diagnostic tool
receiving and analyzing the description of the error embedded into the communication protocol; and
determining a cause of the error and an associated solution,
wherein the communication protocol is in compliance with IEEE 802.11 and the description is embedded in a Probe Request Management Frame and is transmitted over the wireless communication network.

* * * * *